(12) United States Patent
Weston

(10) Patent No.: US 12,377,832 B1
(45) Date of Patent: Aug. 5, 2025

(54) VEHICLE OPERATION IN ONE-WHEEL DIG MODE

(71) Applicant: Ford Global Technologies, LLC, Dearborn, MI (US)

(72) Inventor: Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/046,595

(22) Filed: Feb. 6, 2025

(51) Int. Cl.
| | |
|---|---|
| *B60W 10/04* | (2006.01) |
| *B60K 7/00* | (2006.01) |
| *B60W 10/184* | (2012.01) |
| *B60W 30/182* | (2020.01) |
| *B60W 50/08* | (2020.01) |

(52) U.S. Cl.
CPC ............ *B60W 10/184* (2013.01); *B60K 7/00* (2013.01); *B60W 10/04* (2013.01); *B60W 30/182* (2013.01); *B60W 50/082* (2013.01); *B60W 2510/22* (2013.01)

(58) Field of Classification Search
CPC .. B60W 10/04; B60W 10/184; B60W 30/182; B60W 50/082; B60W 2510/22; B60K 7/00
See application file for complete search history.

(56) References Cited

U.S. PATENT DOCUMENTS

| | | |
|---|---|---|
| 2,953,413 A | 9/1960 | Jankauskas |
| 9,682,710 B2 | 6/2017 | Darnell et al. |
| 11,390,322 B2 * | 7/2022 | Korsch ............... B60W 30/182 |
| 11,738,617 B2 | 8/2023 | Rothwell et al. |
| 11,752,826 B2 | 9/2023 | Johnson et al. |
| 2005/0004732 A1 | 1/2005 | Berry et al. |
| 2006/0076828 A1 | 4/2006 | Lu et al. |
| 2007/0255465 A1 | 11/2007 | Brown et al. |
| 2009/0107748 A1 | 4/2009 | Luehrsen et al. |
| 2018/0251106 A1 | 9/2018 | Kasteel |

(Continued)

FOREIGN PATENT DOCUMENTS

| | | | |
|---|---|---|---|
| CN | 211090572 U | * | 7/2020 |
| DE | 102016214639 A1 | | 2/2018 |

(Continued)

OTHER PUBLICATIONS

Fodor et al.—"Active control of vehicle dynamics", Abstract only, https://ieeexplore.ieee.org/document/739865?source=IQplus, 17th DASC, AIAA/IEEE/SAE, Digital Avionics Systems Conference, Proceedings (Cat. No. 98CH36267), DOI: 10.1109/DASC.1998.739865, Oct. 31, 1998-Nov. 7, 1998.

(Continued)

*Primary Examiner* — Edwin A Young
(74) *Attorney, Agent, or Firm* — Lorne Forsythe; Brooks Kushman P.C.

(57) ABSTRACT

A computer for a vehicle has a processor and memory storing instructions executable by the processor to apply rotational power to one wheel of a vehicle and apply brake to three other wheels of the vehicle in response to activation of one-wheel dig mode of the vehicle by a human operator of the vehicle. The instructions include instruction to, in response to detection of completion of a hole in ground under the one wheel in the one-wheel dig mode, cease application of rotational power to the one wheel of the vehicle.

20 Claims, 4 Drawing Sheets

(56) References Cited

U.S. PATENT DOCUMENTS

| | | | |
|---|---|---|---|
| 2021/0253162 A1 | 8/2021 | Thompson et al. | |
| 2023/0256786 A1 | 8/2023 | Johnson et al. | |
| 2024/0109385 A1 | 4/2024 | Mistry et al. | |

FOREIGN PATENT DOCUMENTS

| | | | | | |
|---|---|---|---|---|---|
| GB | 2560590 | A | * | 9/2018 | ............. B60T 8/175 |
| JP | 2016193698 | A | | 11/2016 | |
| JP | 2023092807 | A | | 7/2023 | |
| WO | 2012150609 | A4 | | 12/2012 | |

OTHER PUBLICATIONS

Jones et al.—"A brief review of air brake wheel lock control systems", Abstract only, https://ieeexplore.ieee.org/document/1622541?source=IQplus, 28th IEEE Vehicular Technology Conference, Mar. 22-24, 1978, DOI: 10.1109/VTC.1978.1622541.

Kucera et al.—"Prototyping a System for Truck Differential Lock Control", Sensors 2019, 19, 3619, Institute of Automotive Engineering, Brno University of Technology, Technicka 2896/2, 616 69 Brno, Czech Republic Published Aug. 20, 2019.

Lu et al.—"From vehicle stability control to intelligent personal minder . . . etc.", Abstract only, https://ieeexplore.ieee.org/document/4938722?source=IQplus, 2009 IEEE Workshop on Computational Intelligence in Vehicles and Vehicular Systems, DOI: 10.1109/CIVVS.2009.4938722, Mar. 30, 2009-Apr. 2, 2009.

Qiu et al.—"ABS/EBD Automobile Auxiliary Brake System based on CAN Bus", Abstract only, https://ieeexplore.ieee.org/document/9626079?source=IQplus, 2021 78th International Symposium on System and Software Reliability (ISSSR), Sep. 23-24, 2021, DOI: 10.1109/ISSSR53171.20-21.00027.

Ressler et al.—"Integrated Chassis And Suspension Controls . . . etc.", Abstract only, http://ieeexplore.ieee.org/document/753473?source=IQplus, International Congress on Transportation Electronics, Oct. 16-17, 1988, DOI: 10.1109/ICTE.1988.753473.

Tseng et al.—"The development of vehicle stability control at Ford", Abstract only, https://ieeexplore.ieee.org/ document/789681?source=IQplus, IEEE/ASME Transactions on Mechatronics, vol. 4, Issue 3, Sep. 1999, DOI: 10.1109/3516.789681.

Voelcker et al. - "Top 10 tech cars", Abstract only, https://ieeexplore.IEEE.org/document/1270545?source=IQplus, IEEE Spectrum, vol. 41, issue 3, Mar. 2004, Doi: 10.1109/MSPEC.2004.1270545.

Whitehead et al.—"In-wheel motors roll again", Abstract only, https://ieeexplore.ieee.org/document/8389184? source=IQplus, IEEE Spectrum, vol. 55, issue 7, Jul. 2018, DOI: 10.1109/MSPEC.2018.839184.

Hojnik et al., "Wheeled Rovers With Posable Hubs for Terrestrial and Extraterrestrial Exploration", Received Jul. 30, 2020, accepted Aug. 18, 2020, date of publication Aug. 21, 2020, date of current version Sep. 2, 2020. Digital Object Identifier 10.1109/ACCESS.2020.3018429.

* cited by examiner

VEHICLE OPERATION IN ONE-WHEEL DIG MODE

BACKGROUND

Some vehicles are used for recreation and/or worksite utility. For example, some vehicles are used recreationally on off-road expeditions, as transportation and/or shelter for camping, etc. As other examples, some vehicles may be used at worksites such as construction sites, property maintenance, etc. There remain opportunities to add amenities to increase functionality of these vehicles.

DETAILED DESCRIPTION

Figure 1:
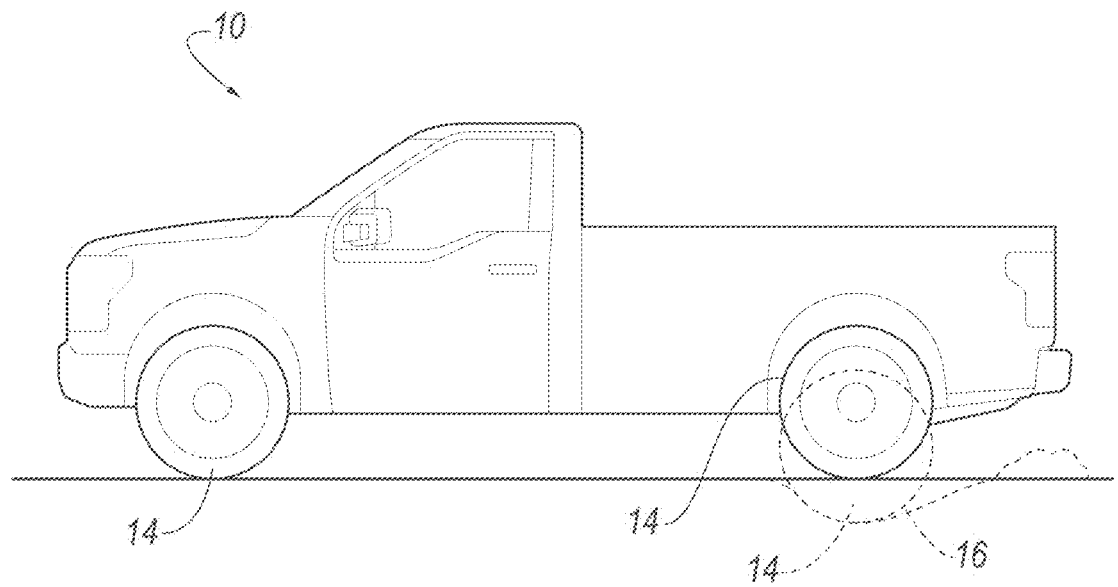
FIG. 1 is a side view of a vehicle with a hole dug by one wheel shown in broken lines.

With reference to the Figures, wherein like numerals indicate like parts throughout the several views, a computer 12 for a vehicle 10, i.e., a vehicle computer 12, has a processor and memory storing instructions executable by the processor to apply rotational power to one wheel 14 of a vehicle 10 and apply brake to three other wheels 14 of the vehicle 10 in response to activation of one-wheel dig mode of the vehicle 10 by a human operator of the vehicle 10. The instructions include instruction to, in response to detection of completion of a hole 16 in ground under the one wheel 14 in the one-wheel dig mode, cease application of rotational power to the one wheel 14 of the vehicle 10.

The human operator, e.g., the operator of the vehicle 10, may provide instruction to operate the vehicle 10 in one-wheel dig mode to spin one of the wheels 14 of the vehicle 10 while maintain the other wheels 14 of the vehicle 10 stationary to dig a hole 16 in the ground below the spinning wheel 14. The human operator may seek to purposefully dig a hole 16 in the ground beneath the vehicle 10 with one of the wheels 14 for a variety of reasons. As one example, the hole 16 may be used in the recovery of another vehicle that is stuck, e.g., during recreational off-roading. In such an example, the hole 16 may be used as an anchoring point for a fulcrum, a come along, etc., to aid in recovery of another vehicle 10. As another example, the hole 16 may be used to anchor the wheel 14 in the hole 16 during use of a winch to retrieve another vehicle from a stuck position. As other examples, the hole 16 may be dug for use in recreational camping, at a job site, etc.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 defines a vehicle-longitudinal axis extending between a front end and a rear-end of the vehicle 10. The vehicle 10 defines a cross-vehicle 10 axis extending cross-vehicle from one side to the other side of the vehicle 10. The vehicle 10 defines a vertical axis. The vehicle-longitudinal axis L, the cross-vehicle 10 axis, and the vertical axis are perpendicular relative to each other. The vehicle 10 includes a vehicle frame and a vehicle body. The vehicle frame and/or the vehicle body defines an occupant cabin to house occupants of the vehicle 10.

The vehicle 10 includes a system including the vehicle computer 12. The vehicle computer 12 may be, for example, a vehicle control module. In other examples, the vehicle computer 12 may be one of or a combination of a vehicle control module, a powertrain control module, a suspension control module, a brake control module, a steering control module, etc. The vehicle computer 12 may be a microprocessor-based computing device, e.g., a generic computing device including a processor and a memory, an electronic controller or the like, a field-programmable gate array (FPGA), an application-specific integrated circuit (ASIC), a combination of the foregoing, etc. A hardware description language such as VHDL (VHSIC (Very High Speed Integrated Circuit) Hardware Description Language) may be used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit.

The memory of the vehicle computer 12 can include media for storing instructions executable by the processor as well as for electronically storing data and/or databases, and/or the vehicle computer 12 can include structures such as the foregoing by which programming is provided. The vehicle computer 12 can be multiple computers coupled together.

The vehicle computer 12 may transmit and receive data through a communications network 18 such as a controller area network (CAN) bus, Ethernet, WiFi, Local Interconnect Network (LIN), onboard diagnostics connector (OBD-II), and/or by any other wired or wireless communications network. The vehicle computer 12 may be communicatively coupled to a propulsion system, a brake system, a suspension system, a steering system, sensors, and other components via the communications network 18.

As set forth above, the vehicle 10 includes wheels 14. The wheels 14 support the weight of the vehicle 10 on underlying ground. Rotation of the wheels 14 are driven by the propulsion system and braked by the braking system. The steering system steers the wheels 14 to steer the direction of travel of the vehicle 10. The suspension system connects the wheels 14 to the frame of the vehicle 10 and dampens force delivered to the frame from a driving surface through the wheels 14. Each wheel 14, for example, may have a rim (which may be metal) and a tire (which may be rubber).

The propulsion system of the vehicle 10 generates energy and translates the energy into rotation of the wheels 14 of the vehicle 10. The propulsion system may include the accelerator pedal to control the operation of the rest of the propulsion system. The accelerator pedal provides input to the computer 12 indicating a position of the accelerator pedal for use in controlling the propulsion system and/or the brake system. The accelerator pedal is positioned to be pressable by an operator of the vehicle 10. In some examples, the accelerator pedal is at a floor of the vehicle 10 for control by a foot of a human driver. In other examples, the accelerator pedal may be in other locations in the interior of the vehicle 10, e.g., a paddle on a steering wheel 14.

In some examples, the propulsion system may include an engine 24, e.g., an internal-combustion engine, coupled to a transmission that transfers rotational motion to wheels 14. As another example, the propulsion system may include an electric powertrain including traction batteries and one or more electric motors, i.e., a traction motor 20, that transfer rotational motion to wheels 14 of the vehicle 10. As another example, the propulsion system may be a hybrid powertrain including elements of the internal combustion powertrain and the electric powertrain. The propulsion system can include an electronic control unit (ECU) or the like, e.g., a powertrain control module, that is in communication with and receives input from the computer 12 and/or a human driver. In some examples, the computer 12 may be the powertrain control module or a component of the powertrain control module. The operator of the vehicle 10 may control the propulsion system via, e.g., an accelerator pedal, a brake pedal, etc.

In examples in which the propulsion system includes an engine 24 such as an internal-combustion engine and/or a hybrid powertrain, the propulsion system may include a drivetrain including the engine 24, a transmission, and drivetrain components that deliver rotational power from the engine 24 and/or the transmission to the wheels 14. The transmission may be an automatic transmission. The drivetrain components may include a differential, a drive shaft between the transmission and the differential, and axles that deliver power from the differential to the wheels 14. The drivetrain components may include a transfer case and/or torque converters for selectively delivering rotational power from the engine 24 to certain wheels 14.

In examples in which the propulsion system includes an engine 24, the vehicle 10 may include a powertrain control unit and/or a drivetrain control unit. In such examples, the powertrain control unit controls the engine 24 based on input from occupant and/or input from vehicle computer 12 based on detected inputs, and the drivetrain control unit controls components of the drivetrain to selectively deliver rotational power from the engine 24 to certain wheels 14.

The drivetrain may include drivetrain actuators 22 that control operation of the drivetrain components to control the magnitude and proportion of rotational power delivered to each wheel 14. In other words, the drivetrain actuators 22 can selectively engage and disengage the drivetrain components to distribute rotational power from the engine 24 to the one or more of the wheels 14, including delivering all rotational power to one of the wheels 14 and no rotational power to the other wheels 14 in one-wheel dig mode. For example, the drivetrain actuators 22 include a transfer case actuator that shifts gears in the transfer case, e.g., between 2-wheel drive engagement and 4-wheel drive engagement. The drivetrain actuators 22 may be, for example, electronic actuators (including an electric motor), a pneumatic actuator, a hydraulic actuator, or any other suitable type. As another example, the drivetrain actuators 22 may include a differential actuator that controls the engagement and disengagement of gears in the differential.

In examples in which the propulsion system is an electric powertrain or a hybrid powertrain, the propulsion system may include a traction motor 20. In such an example, each traction motor 20 transfers rotational motion to one or more wheels 14 based on input from the vehicle computer 12 through the communications network 18, e.g., from the powertrain control module. In some examples, the traction motors 20 may be a known type. For example, the traction motor 20 may be of a known type for propulsion of the vehicle 10 in an electric or hybrid vehicle 10. The wheel 14 transmits rotation from the traction motor 20 to the ground to propel the vehicle 10. In some examples, the traction motor 20 may drive an axle. In other examples, the traction motor 20 may be a wheel hub motor that drives an individual wheel 14.

The traction motor 20 is operably coupled to one or more wheels 14 of the vehicle 10 to deliver rotational power to the individual wheels 14. A gearbox may be included to change a speed ratio between the traction motor 20 and the respective wheel 14. The traction motor 20 is capable to provide a positive torque to propel the vehicle 10 and may be capable of acting as a generator to provide a negative torque to brake the vehicle 10 such as via regenerative braking. The traction motor 20 may be a permanent magnet three-phase alternating current (AC) electric motor or other suitable type.

In examples including traction motors 20 coupled to more than one wheel 14 and in examples in which the vehicle 10 has a traction motor 20 dedicated to each wheel 14, respectively, the traction motors 20 are operable to independently control rotational power at each wheel 14. For example, any one wheel 14 can be rotated while the other wheels 14 receive no rotational power from a traction motor 20, such as in examples in which the vehicle 10 is operated in one-wheel dig mode. In examples in which more a traction motor 20 is coupled to more than one wheel 14, gearboxes, clutches, etc., may selectively engage or disengage one or more of the wheels 14 from the traction motor 20 to deliver rotational power to one wheel 14 and deliver no rotational power to other wheels 14 in one-wheel dig mode. In examples in which the vehicle 10 has a traction motor 20 dedicated to each wheel 14, the vehicle computer 12 individually controls the traction motors 20 to deliver rotational power to one wheel 14 and deliver no rotational power to the other wheels 14 in one-wheel dig mode.

The traction motor 20 is powered by one or more traction batteries. The traction battery stores energy that can be used by the traction motor 20. The traction battery may provide a high-voltage direct current (DC) output from one or more battery cell arrays, sometimes referred to as battery cell stacks, within the traction battery. The traction battery may be electrically connected to one or more power-electronics modules, e.g., the powertrain control module, through one or more contactors. The powertrain control module may be electrically connected to the traction motor 20 and may provide the ability to bi-directionally transfer electrical energy between the traction battery and the traction motor 20. For example, a traction battery may provide a DC voltage while the traction motor 20 may require a three-phase AC. The power-electronics module may convert the DC voltage to a three-phase AC voltage as required by the traction motor 20. In a generator mode, which may be during regenerative braking, the power-electronics module may convert the three-phase AC voltage from the traction motor 20 acting as a generator to the DC voltage required by the traction battery. The traction battery assembly may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs).

The brake system slows rotation of the wheels 14 to decelerate the vehicle 10 using brake components 26, e.g., friction brakes operable by depression of the brake pedal. The brake system slows or stops rotation of the wheels 14 relative to the ground. The friction brakes apply brake torque to the wheels 14 of the vehicle 10. In some examples, the brake system may engage components of the wheels 14 to slow or stop the spinning of the wheels 14, e.g., may include friction brakes such as disc brakes, drum brakes, band brakes, etc. The friction brakes are controlled by depression of the brake pedal and/or the vehicle computer 12. Specifically, the brake pedal is depressed to generate friction with components rotatable with the wheel 14 to generate brake torque to slow the rotation of the wheel 14. For example, the depression of the brake pedal actuates a brake pad against a brake rotor, a brake shoe against drum, etc., when the wheel 14 is spinning to slow rotation of the wheel 14. In one-wheel dig mode, the vehicle computer 12 controls the operation of the brake system to allow rotation of the one wheel 14 that is digging the hole 16 and to prevent rotation of the other three wheels 14. In response to detection of completion of the hole 16, the vehicle computer 12 brakes the wheel 14 digging the hole 16 to stop rotation of that wheel 14.

Figure 4:
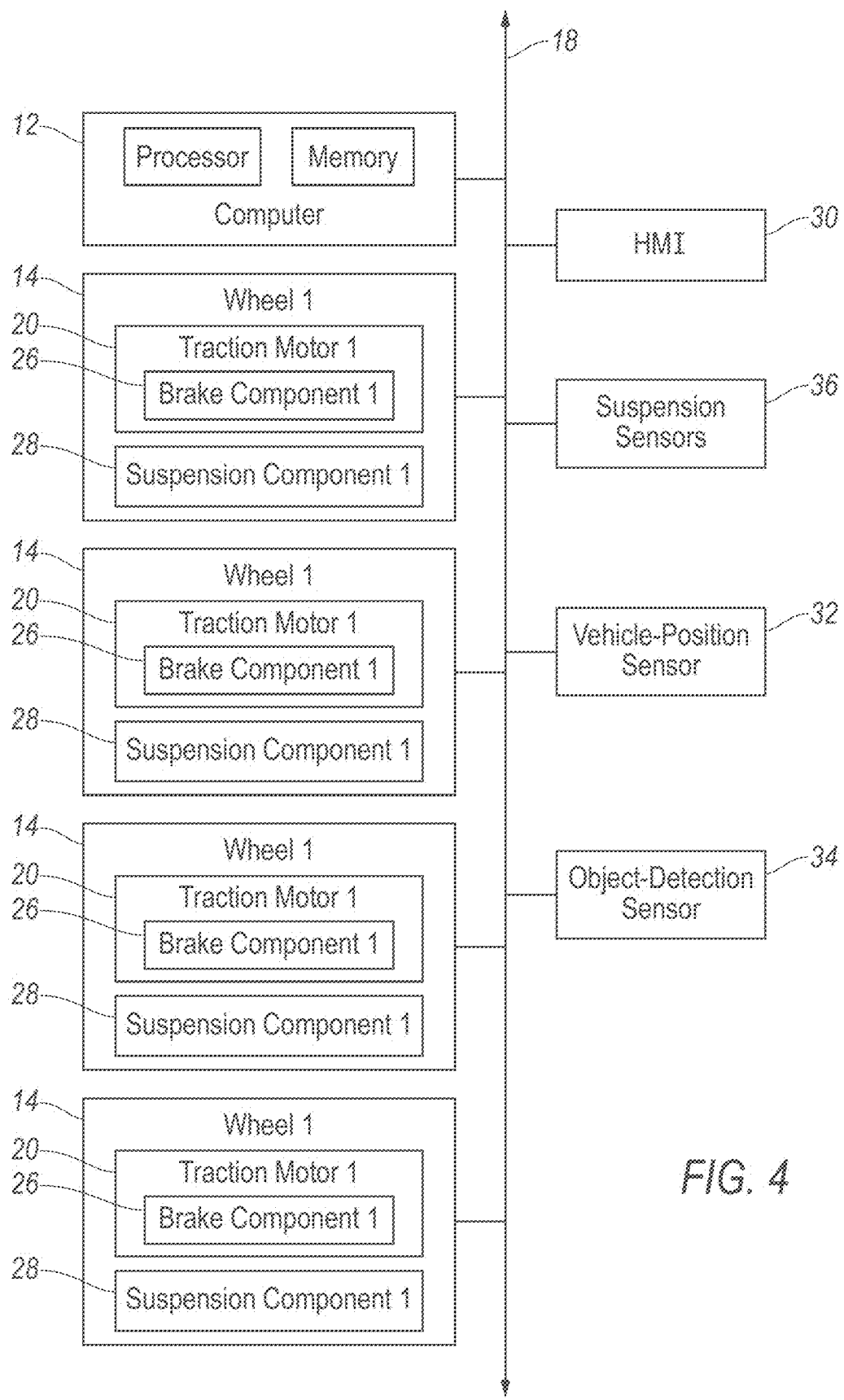
FIG. 4 is another example system of the vehicle.

In some examples, the vehicle 10 includes may be regenerative brakes. As set forth above, in some examples, such as the example shown in FIG. 4, the regenerative brakes include a braking component that brakes the wheel 14. In some examples, the braking component may be a component of the traction motor 20 to brake the respective wheel 14. In such an example, a component of the traction motor 20 slows or stops rotation of the respective wheel 14 relative to the ground. Components of the brake system may be of any suitable type of brakes, including, in some examples, those that are known. The brake system may additionally include a parking brake operable to prevent movement of the vehicle 10 when the vehicle 10 is in a Park setting (e.g., a gear shifter is in "Park" to place a transmission of the vehicle 10 in Park).

The brake system may be a hydraulic system, an electric system, or a combination of electric and hydraulic to actuate the friction brakes. In a hydraulic system, depression of the brake pedal actuates a master cylinder to pressurize brake fluid in the hydraulic system to actuate the friction brakes. The master cylinder actuates the friction brakes by controlling the pressure level at the friction brakes. The brake system may be a brake-by-wire system that uses brake pedal sensors and actuators to engage the friction brakes rather than a direct mechanical connection between the brake pedal and a master cylinder. In such examples, an electronic control unit can provide input to the actuator and/or the master cylinder and actuate the master cylinder based on the received data from the brake pedal sensors indicating the position of the brake pedal. The brake pedal sensors are configured to sense movement of the brake pedal and output a signal indicative of this movement. The brake system can include an electronic control unit (ECU) or the like, e.g., a brake control module, that is in communication with and receives input from an operator of the vehicle 10. In some examples, the computer 12 may be the brake control module or a component of the brake control module.

As set forth above, the suspension system connects the wheels 14 of the vehicle 10 to the frame of the vehicle 10. Specifically, the suspension system absorbs vibration generated from movement of the wheels 14 over a driving surface and controls the wheels 14 to maintain contact with the driving surface.

The suspension system includes suspension components 28. The suspension components 28 may include, for example, shock absorbers, struts, stabilizer bars, etc. The suspension system may, for example, include a shock absorber at each wheel 14, respectively, i.e., four shock absorbers or struts. The shocks absorbers dampen the bounce of the wheel 14 while rolling over the driving surface. In some examples, the shock absorbers are adaptive, i.e., electronically controlled. In such examples, the vehicle computer 12 controls the state and performance of the shock absorbers. In examples in which the shock absorbers are adaptive, the state and performance of the shock absorber may be adjusted pneumatically (e.g., with electronically-controlled air springs), hydraulically (e.g., with a fluid-powered lift system), or electromagnetically (e.g., with magnetorheological fluid). Components of the shock absorbers can be adjusted by the vehicle computer 12 to adjust stiffness and rebound of the shock absorber and ride height of the shock absorber, i.e., can raise and lower the ride height of the vehicle 10. The ride height is the ground clearance between the frame of the vehicle 10 and the ground.

In examples in which the suspension system is adaptive, the suspension system includes sensors, i.e., suspension sensors 36, that detect performance of and input to the suspension system. For example, in examples in which the shock absorbers are active, the shock absorbers include sensors that detect performance of and input to the shock absorber, e.g., extension of the shock absorber.

The suspension system may include a stabilizer bar. The stabilizer bar can link two wheels 14 on opposite sides of the vehicle 10 to control body roll of the vehicle 10. The stabilizer bar can be an active stabilizer bar with components adjustable by the vehicle computer 12. For example, the stabilizer bar can be adjusted by the vehicle computer 12 to change the stiffness of the stabilizer bar between two wheels 14. The active stabilizer bar, for example, may be electronically controlled and/or hydraulically controlled.

The vehicle 10 includes a lighting system. The lighting system may include interior lights inside the passenger cabin of the vehicle 10 and exterior lights such as headlights, brake lights, running lights, hazard lights, etc. The vehicle computer 12 may control the operation of the lights.

The vehicle 10 includes a sound system including audio speakers. The vehicle computer 12 may control the operation of the sound system.

The vehicle 10 may include a human machine interface (HMI) 30 for manually controlling features of the vehicle 10, including activating and deactivating one-wheel dig mode. The HMI 30 may be located, for example, on an instrument panel in a passenger cabin of the vehicle 10. The HMI 30 may include dials, digital readouts, screens, speakers, and so on for providing information to the occupant. The HMI 30 may include buttons, knobs, keypads, microphone, etc., for receiving information from the operator. As an example, the vehicle 10 may include a touchscreen with various menus and setting selections that may be selected, e.g., by touching an icon on the touchscreen. One of these setting selections may be for activation one-wheel dig mode. As an example, the HMI 30 may be an electro-mechanical toggle, button, switch, etc., for activation of one-wheel dig mode.

As an example, the user may implement the one-wheel dig mode based on a touch-and-hold of the HMI 30, i.e., an initial touch to initiate the one-wheel dig mode and maintaining the touch to continue the one-wheel dig mode to completion. In such an example, if touch of the HMI 30 is interrupted, one-wheel dig mode is deactivated until touch resumes. As another example, the user may implement the one-wheel dig mode based on repeated touch of the HMI 30. In such examples, the hole 16 dug in one-wheel dig mode is incrementally completed from initiation to completion. In such examples, operation of the vehicle 10 to dig an increment of the hole 16 is performed in response to touch of the HMI 30, and after that increment is completed, another touch of the HMI 30 initiates digging of another increment of the hole 16.

The vehicle 10 includes a variety of sensors for detecting operation, performance, and elements in the surroundings of the vehicle 10. For example, the vehicle 10 may include operation sensors that detect operation and performance of the vehicle 10, for example, wheel 14 speed, wheel orientation, and engine and transmission variables. The vehicle 10 may include vehicle-position sensors 32 that detect the position or orientation of the vehicle 10, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. As an example, the vehicle-position sensors 32 may detect movement of the vehicle 10 during operation in the one-wheel dig mode. The vehicle 10 may include object-detection sensors 34 that detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. As another example, one or more radar sensor may be fixed to exterior components of the vehicle 10 to provide data to provide locations of the objects, second vehicle 10s, etc., relative to the location of the vehicle 10. As another example, the vehicle sensors may include cameras providing images from an area surrounding the vehicle 10. In the context of this disclosure, an object is a physical, i.e., material, item that can be represented by physical phenomena (e.g., light or other electromagnetic waves, or sound, etc.) detectable by vehicle sensors. As an example, the object-detection sensors 34 may detect living beings, such as humans, animal (such as pets), etc., in the surrounding of the vehicle 10, e.g., within a predetermined vicinity, during operation in the one-wheel dig mode.

In operation, the operator of the vehicle 10 may select one-wheel dig mode to purposefully dig a hole 16 in the ground beneath the vehicle 10. Specifically, when the operator operates the vehicle 10 in one-wheel dig mode, one of the wheels 14 of the vehicle 10 is rotated while maintaining the other wheels 14 of the vehicle 10 stationary to dig a hole 16 in the ground below the spinning wheel 14. The operator may select initiation of one-wheel dig mode through the HMI 30. In some examples, the operator may select which of the wheels 14 will dig the hole 16 (and thus the other wheels 14 that remain stationary during one-wheel dig mode. When one-wheel dig mode is selected through the HMI 30, the vehicle 10 may control suspension components 28 before initiation of the one-wheel dig mode. As one example, the suspension components 28 may be adjusted to increase ride height at the wheel 14 that will dig the hole 16 and to decrease ride height at the other wheels 14. This allows the suspension component 28 at the digging wheel 14 to droop into the hole 16 as the hole 16 is dug. Before initiation or upon initiation of one-wheel dig mode, the HMI 30 may provide feedback, e.g., audible and/or visual feedback, indicating to the operator that the vehicle 10 is being operated in one-wheel dig mode. The vehicle computer 12 may require a touch-and-hold operation through the HMI 30 to continue operation of the vehicle 10 in one-wheel dig mode. The vehicle computer 12 may deactivate one-wheel dig mode based on detected inputs. As one example, the vehicle 10 may monitor for movement of the vehicle 10 at the stationary wheels 14 during operation in one-wheel dig mode and may deactivate one-wheel dig mode in response to detection of movement of the vehicle 10. As another example, the vehicle 10 may monitor the surroundings of the vehicle 10 for living beings, such as humans moving into the surroundings of the exterior of the vehicle 10, during operation of the vehicle 10 in one-wheel dig mode and may deactivate one-wheel dig mode in response to detection of a living being in the surroundings of the exterior of the vehicle 10. The operator may deactivate the one-wheel dig mode by input to the HMI 30, e.g., by releasing touch of the HMI 30. The vehicle 10 may deactivate one-wheel dig mode based on detection of completion of the hole 16. Completion of the hole 16 may be detected by the vehicle 10. As an example, completion may be detected by droop position of the suspension component 28 at the digging wheel 14. After termination of the one-wheel dig mode, components of the vehicle 10, e.g., suspension components 28, may be returned to the state of those components immediately preceding activation of the one-wheel dig mode.

The vehicle computer 12 is programmed to (i.e., has memory storing instructions executable by the processor to) receive inputs and provide outputs to operate the vehicle 10 in one-wheel dig mode. The vehicle computer 12 is programmed to carry out methods described herein, including the method 500 shown in FIG. 5. Use of "in response to" and "based on" with reference to the operation of the vehicle computer 12 indicates a causal relationship, not merely a temporal relationship.

The vehicle computer 12 may be programmed to enable or disable one-wheel dig mode. As an example, one-wheel dig mode may be enabled or disabled using based on input from the operator, e.g., via input by the operator through the HMI 30. When enabled, one-wheel dig mode may be selectively activated by the operator. When not enabled, one-wheel dig mode is unavailable for activation. The vehicle computer 12 is programmed to activate one-wheel dig mode in response to input from the operator through the HMI 30 and is programmed to deactivate one-wheel dig mode in response to input from the operator through the HMI 30 and/or in response to other inputs, e.g., inputs from operation sensors, position sensors 32, suspension sensors 36, etc. When one-wheel dig mode is activated, one of the wheels 14 spins while the other wheels 14 are maintained stationary. Components of the vehicle 10, e.g., the steering system, the brake system, etc., may be adjusted while one-wheel dig mode is activated prior to providing rotational power to the one wheel 14. When one-wheel dig mode is deactivated, the spinning wheel 14 is stopped.

The vehicle computer 12 is programmed to receive input for activation of one-wheel dig mode of the vehicle 10 by a human operator of the vehicle 10. As set forth above, one-wheel dig mode may be activated by input through the HMI 30.

In response to activation of one-wheel dig mode, the computer 12 may be programmed to receive selection of any one wheel 14 of the vehicle 10 as the one wheel 14 to which rotational power is applied in the one-wheel dig mode. The computer 12 may be programmed to prompt the operator for input of selection of the wheel 14 to which rotational power is applied in one-wheel dig mode, e.g., the computer 12 may prompt the user to select the wheel 14 through the HMI 30.

In response to activation of one-wheel dig mode, the vehicle 10 may instruct the steering system to straighten the wheels 14 prior to rotating one of the wheels 14 in one-wheel dig mode. When the wheels 14 are straightened, the wheels 14 are positioned so that the vehicle 10 would travel in a straight line when rotational power is supplied to all wheels 14.

In response to activation of one-wheel dig mode. The vehicle 10 is programmed to adjust suspension components 28 of the vehicle 10 to exert force on the one wheel 14 of the vehicle 10 to which rotational power is applied in the one-wheel dig mode. For example, in response to activation of the one-wheel dig mode, the computer 12 is programmed to increase ride height of the one wheel 14 to which rotational power is applied in the one-wheel dig mode and to decrease ride height to the three other wheels 14 in response to selection of one-wheel dig mode of the vehicle 10 by the human operator of the vehicle 10. As set forth above, this allows the suspension component 28 at the digging wheel 14 to droop into the hole 16 as the hole 16 is dug. In some examples, adjustment of the ride height includes adjusting the full droop of the suspension component 28, e.g., the shock absorber, at the wheel 14 to be spun in one-wheel dig mode. In some examples, as set forth above, the shock absorbers may be adaptive. In such examples, in response to activation of one-wheel dig mode, the vehicle computer 12 may instruct the shock absorbers to adjust ride height. In examples in which the shock absorbers are adaptive, in response to activation of one-wheel dig mode, the computer 12 may be programmed to adjust the stiffness and/or rebound of the shock absorbers.

Figure 2:
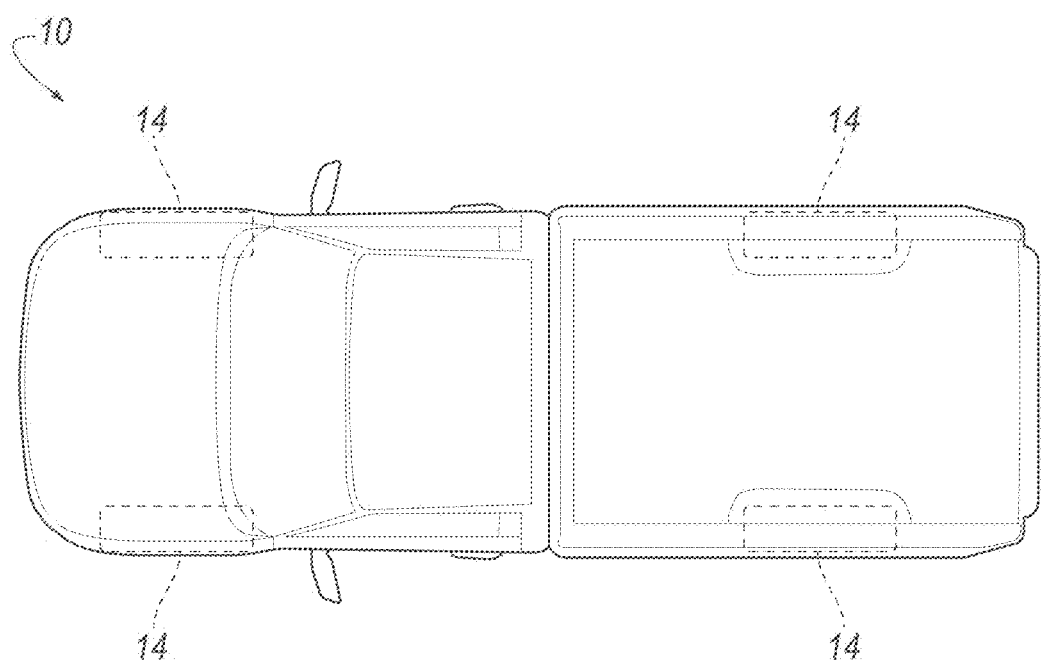
FIG. 2 is a top view of the vehicle.
Figure 3:
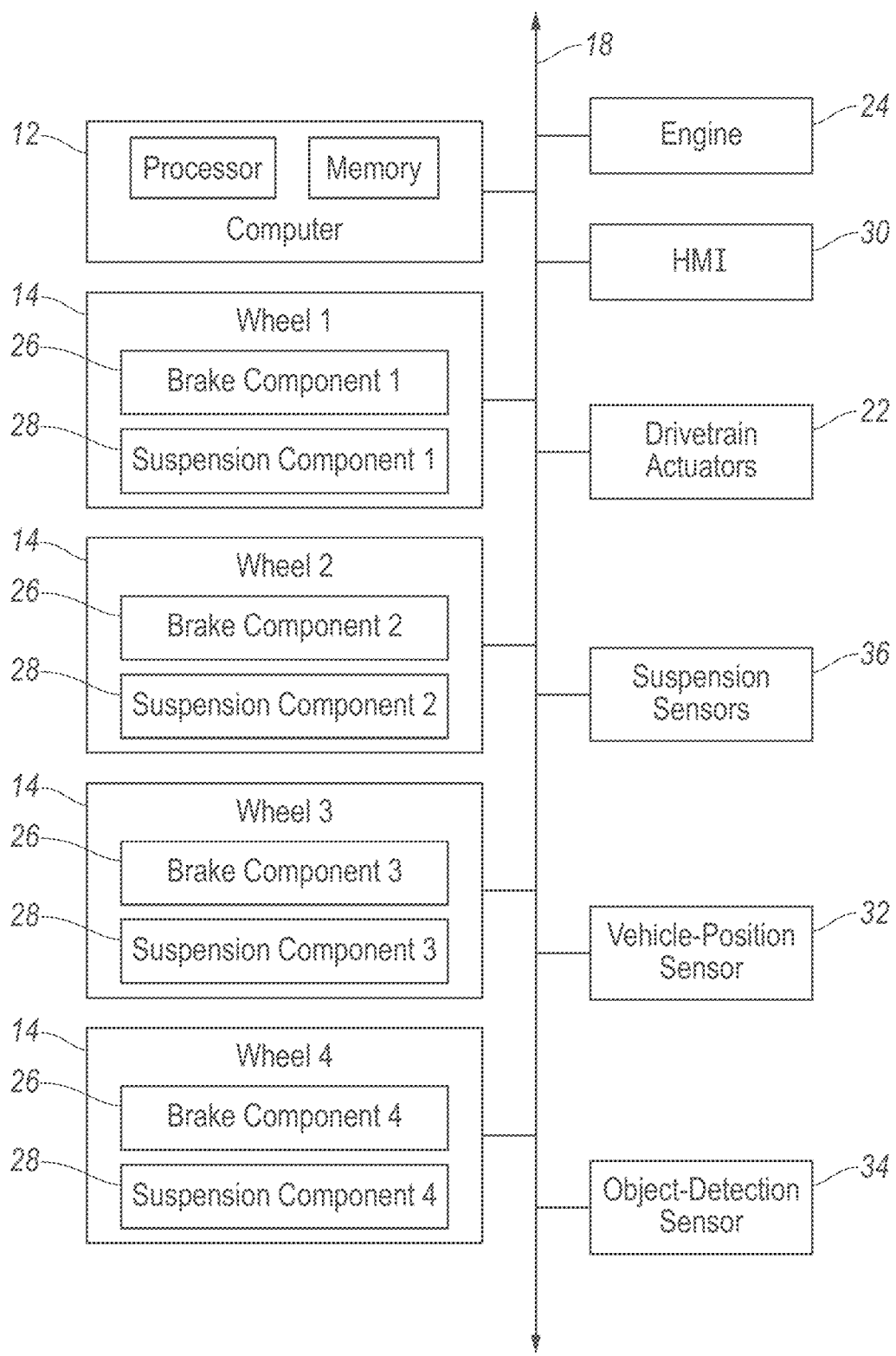
FIG. 3 is an example system of the vehicle.

The computer 12 is programmed to apply rotational power to one wheel 14 of a vehicle 10 and apply brake to three other wheels 14 of the vehicle 10 in response to the activation of one-wheel dig mode of the vehicle 10 by a human operator of the vehicle 10. The vehicle computer 12 may control the powertrain control unit to provide rotational power to the spinning wheel 14. The vehicle computer 12 may control the amount of power delivered to the spinning wheel 14. In some examples, such as in the example in FIG. 2, in which the vehicle 10 includes an engine 24, the vehicle computer 12 may control the speed of the engine 24. In the example shown in FIG. 3, applying rotational power to one wheel 14 of the vehicle 10 includes adjusting driveline components to transfer rotational power from the engine 24 to the one wheel 14. This can include controlling the drivetrain actuators 22, e.g., engaging the transfer case in 2WD, opening the rear differential, apply rotational power to one of the axles, etc. In the example shown in FIG. 4, applying rotational power to the one wheel 14 includes applying power to a traction motor 20 of the one wheel 14. In the examples in both FIGS. 3 and 4, applying rotational power to the one wheel 14 may include controlling other electronically-controlled components of the vehicle 10 such as driveline components, steering components, brake components 26, etc., to adjust components controlling jounce (e.g., to reduce jounce control), the stabilizer bar, anti-lock braking components, and/or traction control components, etc.

When the vehicle computer 12 applies rotational power to one of the wheels 14, the computer 12 applies brakes to other wheels 14 of the vehicle 10 in one-wheel dig mode. Specifically, the computer 12 may control the brake system to brake the wheels 14 in one-wheel dig mode to prevent rotation of the wheels 14. As an example, the brake system may apply friction brakes, as described above, e.g., through the operation of the brake control module as instructed by the vehicle computer 12. In the example shown in FIG. 4, the vehicle 10 compute may apply brake torque by the traction motors 20, as described above.

The vehicle computer 12 is programmed to monitor the vehicle 10 for movement at the stationary wheels 14 of the vehicle 10 during application of rotational power to the one wheel 14 in the one-wheel dig mode. The computer 12 is programmed to cease application of rotational power to the one wheel 14 of the vehicle 10, e.g., by deactivating one-wheel dig mode, in response to detection of movement of the vehicle 10 at the three other wheels 14 of the vehicle 10 during application of rotational power to the one wheel 14 in one-wheel dig mode. This ensures that the vehicle 10 is digging a hole 16 in one location at the spinning wheel 14. Movement of the vehicle 10 at the three stationary wheels 14 may be detected by the position sensors 32, as described above.

The vehicle computer 12 is programmed to monitor surroundings of the vehicle 10 for presence of living beings during the application of rotational power to the one wheel 14 in the one-wheel dig mode. The vehicle computer 12 is programmed to cease application of rotational power to the one wheel 14 of the vehicle 10, e.g., by deactivating one-wheel dig mode, in response to detection of a living being in the surrounding of the vehicle 10 during application of rotational power to the one wheel 14 in one-wheel dig mode. The surroundings of the vehicle 10 may be predetermined vicinity of the vehicle 10. For example, the surroundings may be a predetermined distance from the perimeter of the vehicle 10. The surroundings of the vehicle 10 may be monitored by object-detection sensors 34, as described above.

The vehicle computer 12 may be programmed to illuminate lights of the light system of the vehicle 10 in response to activation of the one-wheel dig mode. Specifically, the vehicle computer 12 may flash lights, e.g., hazard lights, to indicate to the operator and/or people exterior to the vehicle 10 that the vehicle 10 is operating in one-wheel dig mode. The vehicle computer 12 may be programmed to provide an audible notification through the sound system to indicate the operator and/or people exterior to the vehicle 10 that the vehicle 10 is operating in one-wheel dig mode.

The vehicle computer 12 may be programmed to, in response to detection of completion of a hole 16 in ground under the spinning wheel 14 in the one-wheel dig mode, to cease application of rotational power to the one wheel 14 of the vehicle 10, e.g., to deactivate the one-wheel dig mode. The completion of the hole 16 may be detected by components of the vehicle 10. For example, a depth of the hole 16 may be correlated to positions of components of the vehicle 10. The vehicle computer 12 may store such correlations (e.g., in a lookup table). As one example, droop of a suspension component 28 (e.g., a shock absorber) may be correlated to the depth of the hole 16 for given ride heights. In such examples, the vehicle 10 may deactivate one-wheel dig mode when the position of components of the vehicle 10 indicate that the hole 16 is completed. The depth of the hole 16 at which the hole 16 is completed may be based on the physical dimensions of the vehicle 10 (e.g., a depth of the hole 16 before bottoming the frame of the vehicle 10 on the ground. As one example, a maximum depth of the hole 16 may be determined by detection of a suspension component 28, e.g., a shock absorber, at full droop. In such examples, the operator may deactivate the one-wheel dig mode by releasing hold on the HMI 30 when the hole 16 reaches a depth desired by the operator before a maximum depth of the hole 16 is reached, or the vehicle computer 12 will deactivate one-wheel dig mode when the maximum depth is reached. In some examples, in response to activation of one-wheel dig mode, the vehicle computer 12 may prompt input from the operator of the desired depth of the hole 16 to be dug within physical dimensions of the vehicle 10 (e.g., before bottoming the frame of the vehicle 10 on the ground). In such examples, desired depth of the hole 16 may be correlated to positions of components of the vehicle 10, e.g., droop of a suspension component 28 (e.g., a shock absorber), and the one-wheel dig mode may be deactivated when the vehicle 10 components reach that position. The detection of positions of suspension components 28 may be based on input to the vehicle computer 12 from suspension sensors 36, as described above.

Figure 5:
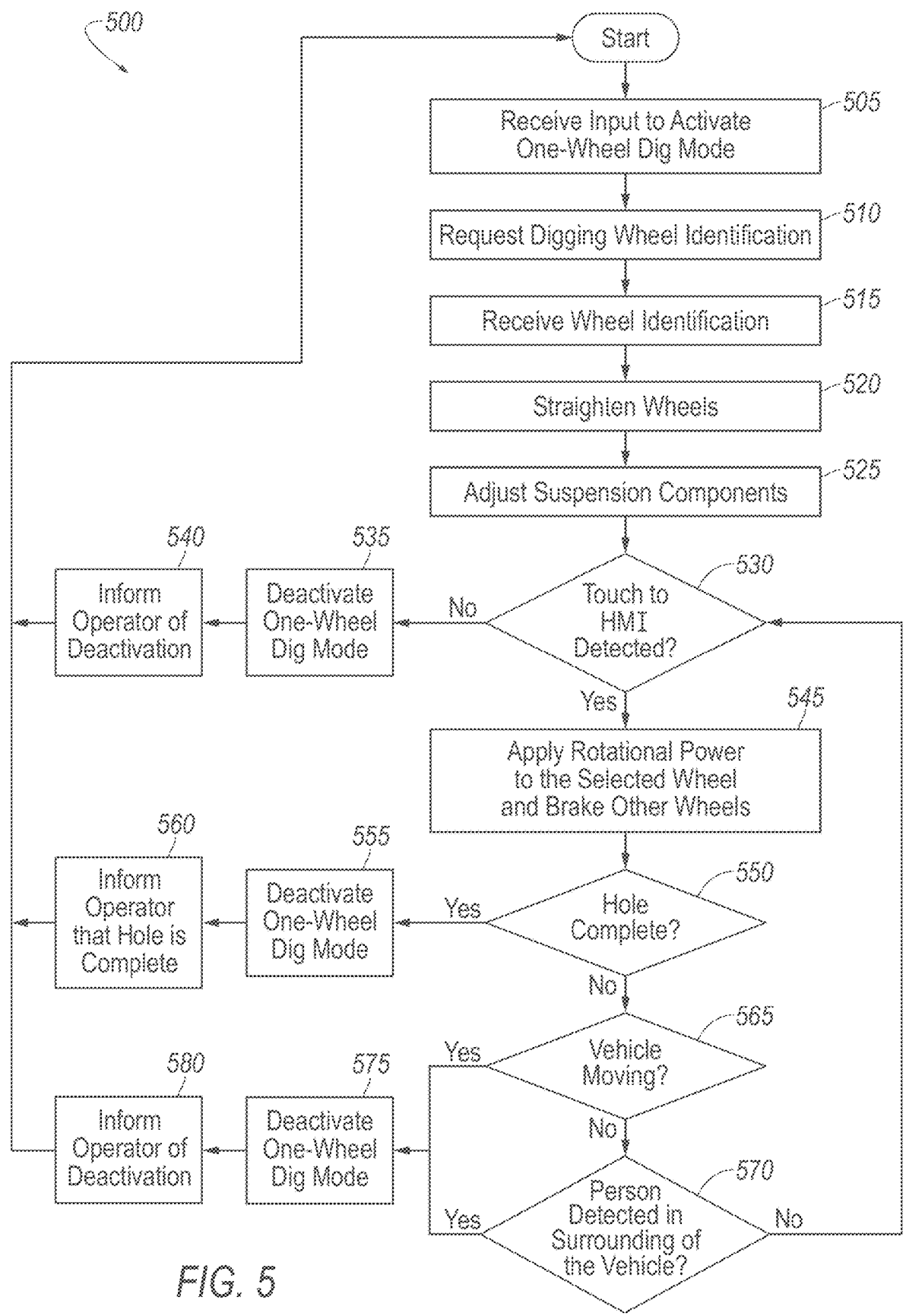
FIG. 5 is an example method.

An example method 500 is shown in FIG. 5. The method includes applying rotational power to one wheel 14 of a vehicle 10 and applying brake to three other wheels 14 of the vehicle 10 in response to activation of one-wheel dig mode of the vehicle 10 by a human operator of the vehicle 10. The method 500 includes, in response to detection of completion of a hole 16 in ground under the one wheel 14 in the one-wheel dig mode, ceasing application of rotational power to the one wheel 14 of the vehicle 10.

As shown in block 505, the method 500 may include receiving input from the operator to activate one-wheel dig mode. As set forth above, one-wheel dig mode may be selected by the operator of the vehicle 10 with use of the HMI 30, e.g., by touch and hold as set forth above.

In block 510, in response to activation of one-wheel dig mode, the method 500 includes requesting an identification by the operator of which one of the wheels 14 will be the digging wheel 14, and thus which of the other wheels 14 will remain stationary. The operator may be prompted to input the identification of the digging wheel 14 through the HMI 30. In block 515, the method 500 includes receiving selection of any one wheel 14 of the vehicle 10 as the one wheel 14 to which rotational power is applied in the one-wheel dig mode. Block 515 may include receiving input from the operator identifying the selection of the digging wheel 14 through the HMI 30.

In block 520, the method 500 may include straightening the wheels 14 of the vehicle 10 prior to rotating one of the wheels 14 in one-wheel dig mode. As set forth above, when the wheels 14 are straightened, the wheels 14 are positioned so that the vehicle 10 would travel in a straight line when rotational power is supplied to all wheels 14.

In such examples, the method 500 may include prompting the operator for input of the desired depth of the hole 16 to be dug within physical dimensions of the vehicle 10 (e.g., before bottoming the frame of the vehicle 10 on the ground). In such examples, the method 500 may include correlating a desired depth of the hole 16 to positions of components of the vehicle 10, e.g., droop of a suspension component 28 (e.g., a shock absorber). In such an example, the one-wheel dig mode may be deactivated when the vehicle 10 components reach that desired depth selected by the operator.

In block 525, the method 500 may include adjusting suspension components 28 in response to activation of one-wheel dig mode. Specifically, the method 500 may include adjusting suspension components 28 of the vehicle 10 to exert force on the one wheel 14 of the vehicle 10 to which rotational power is applied in the one-wheel dig mode in response to activation of the one-wheel dig mode. As an example, the method 500 may include increasing ride height of the one wheel 14 to which rotational power is applied in the one-wheel dig mode and decreasing ride height to the three other wheels 14 in response to activation of one-wheel dig mode of the vehicle 10 by the human operator of the vehicle 10. As set forth above, in some examples the suspension system may be adaptive and the ride height may be adjusted by controlling components of the adaptive suspension system. In other examples, in addition to or in the alternative to adjusting the suspension components 28 for ride height, the method 500 may include controlling other components of the suspension system (e.g., the stabilizer bar) and/or components of other systems (e.g., anti-lock braking components, and/or traction control components, etc.) to adjust ride height, jounce, stiffness, and/or rebound of suspension components 28, e.g., the shock absorbers.

The method 500 includes confirmation of selection of continued activation of the one-wheel dig mode by the operator, as shown in block 530. As an example, block 530 may require touch-and-hold of the HMI 30 by the operator to maintain activation of one-wheel dig mode while the one wheel 14 is spinning. In such an example, in the event the operator releases the HMI 30 (e.g., takes a finger off the icon used to activate one-wheel dig mode on the touch, releases the button that activated the one-wheel dig mode, etc.), the one-wheel dig mode is deactivated, i.e., spinning of the one wheel 14 is stopped, as shown in block 535, and the operator is informed of the deactivation, as shown in block 5540, e.g., by audio and/or visual feedback on the HMI 30, by notification through the lighting system, by notification through the sound system, etc. In the event the operator determines that the hole 16 in the ground dug by the spinning wheel 14 is of a desired depth, e.g., upon visual inspection, the operator may release the HMI 30 to deactivate one-wheel dig mode and proceed to blocks 555 and 560.

In response to confirmation of selection of continued activation of the one-wheel dig mode in block 530, the method 500 includes applying rotational power to the selected wheel 14 and braking the other wheels 14, as shown in block 545. As set forth above, in some examples, such as the example shown in FIG. 3, the method 500 includes delivering rotational power to the one wheel 14 by controlling speed of the engine 24, e.g., with the powertrain control unit, and/or by controlling actuation of drivetrain components, e.g., by controlling drivetrain actuators 22. In some examples, such as the example shown in FIG. 4, the method 500 includes delivering rotational power to the one wheel 14 by controlling the traction motor 20, e.g., the traction motor 20 at that wheel 14 in examples in which the vehicle 10 includes a traction motor 20 at each wheel 14. As set forth above, the wheels 14 that do not receive rotational power in one-wheel drive mode may be braked. As an example, the method 500 includes applying brakes with a brake component 26, e.g., a friction brake, as instructed by the vehicle computer 12. In the example in FIG. 4, the method 500 may include applying brakes with the traction motor 20 at the wheel 14 as instructed by the vehicle computer 12.

In block 550, the method 500 includes determining whether the hole 16 is completed. As set forth above, in one example, a maximum depth of the hole 16 may be determined by detection of a suspension component 28, e.g., a shock absorber, at full droop. As another example, as set forth above, the desired depth of the hole 16 may be input by the operator when prompted to do so through the HMI 30. The one-wheel dig mode may be deactivated when the hole 16 is completed, e.g., the vehicle 10 components reach that desired depth selected by the operator or the maximum depth of the hole 16 selected by the operator. The detection of positions of suspension components 28 may be based on input to the vehicle computer 12 from suspension sensors 36, as described above, and the completion of the hole 16 may be detected by suspension sensors 36 in the suspension system. As one example, the method 500 includes detecting completion of the hole 16 based on detection of a suspension component 28, e.g., a shock absorber, for the one wheel 14 being at full droop. In such an example, the droop of the suspension component 28 was set in block 525.

When completion of the hole 16 is detected, the method 500 includes deactivating the one-wheel dig mode, as shown in block 555 and informing the operator that the hole 16 is complete, e.g., through the HMI 30, as show in block 560.

The method 500 includes ceasing application of rotational power to the spinning wheel 14 of the vehicle 10 in one-wheel dig mode in response to detection of movement of the vehicle 10 at the stationary wheels 14 of the vehicle 10 during application of rotational power to the one wheel 14 in one-wheel dig mode, as shown in block 565. In other words, in the event the stationary wheels 14 slide on the ground during activation of the one-wheel dig mode, the one-wheel dig mode is deactivated. The method 500 includes receiving input from vehicle-position sensors 32 to detect sliding of the stationary vehicle 10 in one-wheel dig mode. In response to detection of movement of the stationary wheels 14 in one-wheel dig mode, one-wheel dig mode is deactivated, as shown in block 575, and the operator is informed that one-wheel dig mode has be deactivated and/or the reason for deactivation, as shown in block 580.

The method 500 includes ceasing application of rotational power to the spinning wheel 14 of the vehicle 10 in response to detection of a living being in a surrounding of the vehicle 10 during application of rotational power to that wheel 14 in one-wheel dig mode. As set forth above, detection of a living being, e.g., a person and/or a pet, in a surrounding of the vehicle 10 may be detected by an object-detection sensor 34. In response to detection of a living being in a surrounding of the vehicle 10 in one-wheel dig mode, one-wheel dig mode is deactivated, as shown in block 575, and the operator is informed that one-wheel dig mode has be deactivated and/or the reason for deactivation, as shown in block 580.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

Such operations described herein should always be implemented and/or performed in accordance with the owner's manual and safety guidelines.

What is claimed is:

1. A computer having a processor and memory storing instructions executable by the processor to:
   apply rotational power to one wheel of a vehicle and apply brake to three other wheels of the vehicle in response to activation of one-wheel dig mode of the vehicle by a human operator of the vehicle; and
   in response to detection of completion of a hole in ground under the one wheel in the one-wheel dig mode, cease application of rotational power to the one wheel of the vehicle.

2. The computer as set forth in claim 1, wherein the instructions include instructions to receive selection of any one wheel of the vehicle as the one wheel to which rotational power is applied in the one-wheel dig mode.

3. The computer as set forth in claim 1, wherein the instructions include instructions to cease application of rotational power to the one wheel of the vehicle in response to detection of movement of the vehicle at the three other wheels of the vehicle during application of rotational power to the one wheel in one-wheel dig mode.

4. The computer as set forth in claim 1, wherein the instructions include instructions to cease application of rotational power to the one wheel of the vehicle in response to detection of a living being in a surrounding of the vehicle during application of rotational power to the one wheel in one-wheel dig mode.

5. The computer as set forth in claim 1, wherein the instructions include instructions to adjust suspension components of the vehicle to exert force on the one wheel of the vehicle to which rotational power is applied in the one-wheel dig mode in response to activation of the one-wheel dig mode.

6. The computer as set forth in claim 1, wherein the instructions include instructions to increase ride height of the one wheel to which rotational power is applied in the one-wheel dig mode and to decrease ride height to the three other wheels in response to activation of one-wheel dig mode of the vehicle by the human operator of the vehicle.

7. The computer as set forth in claim 1, wherein the instructions include instructions to adjust at least one suspension component to increase ride height at the one wheel to which rotational power is applied in the one-wheel dig mode and to decrease ride height at the three other wheels in response to activation of one-wheel dig mode of the vehicle by the human operator of the vehicle.

8. The computer as set forth in claim 7, wherein the instructions include instructions to detect completion of the hole by the one wheel in one-wheel dig mode based on detection of a suspension component for the one wheel being at full droop.

9. The computer as set forth in claim 1, wherein the instructions include instructions to detect completion of the hole by the one wheel in one-wheel dig mode based on detection of a suspension component for the one wheel being at full droop.

10. The computer as set forth in claim 1, wherein applying rotational power to the one wheel includes applying power to a traction motor of the one wheel.

11. The computer as set forth in claim 1, wherein applying rotational power to the one wheel includes controlling engagement of driveline components to transfer rotational power from an engine to the one wheel.

12. The computer as set forth in claim 1, wherein the instructions to apply brake to three other wheels of the vehicle in response to activation of one-wheel dig mode includes instructions to prevent rotation of the three other wheels.

13. A method comprising:
    applying rotational power to one wheel of a vehicle and applying brake to three other wheels of the vehicle in response to activation of one-wheel dig mode of the vehicle by a human operator of the vehicle; and
    in response to detection of completion of a hole in ground under the one wheel in the one-wheel dig mode, ceasing application of rotational power to the one wheel of the vehicle.

14. The method as set forth in claim 13, further comprising receiving selection of any one wheel of the vehicle as the one wheel to which rotational power is applied in the one-wheel dig mode.

15. The method as set forth in claim 13, further comprising ceasing application of rotational power to the one wheel of the vehicle in response to detection of movement of the vehicle at the three other wheels of the vehicle during application of rotational power to the one wheel in one-wheel dig mode.

16. The method as set forth in claim 13, further comprising ceasing application of rotational power to the one wheel of the vehicle in response to detection of a living being in a surrounding of the vehicle during application of rotational power to the one wheel in one-wheel dig mode.

17. The method as set forth in claim 13, further comprising adjusting suspension components of the vehicle to exert force on the one wheel of the vehicle to which rotational power is applied in the one-wheel dig mode in response to activation of the one-wheel dig mode.

18. The method as set forth in claim 13, further comprising increasing ride height of the one wheel to which rotational power is applied in the one-wheel dig mode and decreasing ride height to the three other wheels in response to activation of one-wheel dig mode of the vehicle by the human operator of the vehicle.

19. The method as set forth in claim 13, further comprising adjusting at least one suspension component to increase ride height at the one wheel to which rotational power is applied in the one-wheel dig mode and decreasing ride height at the three other wheels in response to activation of one-wheel dig mode of the vehicle by the human operator of the vehicle.

20. The method as set forth in claim 13, further comprising detecting completion of the hole by the one wheel in one-wheel dig mode based on detection of a suspension component for the one wheel being at full droop.

* * * * *